United States Patent
Filkins et al.

(10) Patent No.: US 6,710,912 B1
(45) Date of Patent: Mar. 23, 2004

(54) TECHNIQUE FOR QUASI-PHASE MATCHING

(75) Inventors: Robert John Filkins, Niskayuna, NY (US); Peter William Lorraine, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/326,124

(22) Filed: Dec. 23, 2002

(51) Int. Cl.$^7$ .............................. G02F 1/355; G02F 1/35
(52) U.S. Cl. ...................... 359/326; 372/21; 385/122
(58) Field of Search ............................. 359/326–332; 372/21–22; 385/122

(56) References Cited

U.S. PATENT DOCUMENTS

| | | | |
|---|---|---|---|
| 5,058,970 A | 10/1991 | Schildkraut et al. | 359/328 |
| 5,170,460 A | 12/1992 | Arvidsson et al. | 385/129 |
| 5,440,421 A * | 8/1995 | Fan et al. | 359/245 |
| 5,600,483 A * | 2/1997 | Fan et al. | 359/245 |
| 5,640,405 A | 6/1997 | Wallace et al. | 372/21 |
| 5,768,302 A | 6/1998 | Wallace et al. | 372/21 |
| 6,304,366 B1 * | 10/2001 | Scalora et al. | 359/328 |
| 2001/0028029 A1 * | 10/2001 | Scalora et al. | 250/216 |

OTHER PUBLICATIONS

Helmy, et al., Quasi Phase Matching In GaAs–A1 As Superlattice Waveguides Through Bandgap Tuning By Use Of Quantum–Well Intermixing, pp. 1370–1372, Optics Letters, vol. 25, No. 18, Sep. 15, 2000.

* cited by examiner

*Primary Examiner*—John D. Lee
(74) *Attorney, Agent, or Firm*—Hunton & Williams LLP

(57) ABSTRACT

A technique for achieving quasi phase matching in a photonic band gap structure comprising a first material and a second material is disclosed. In one particular exemplary embodiment, the technique may be realized by calculating a coherence length of an optical interaction of interest involving at least a first frequency and a second frequency; calculating a first lattice constant of the first material to achieve a predetermined first group velocity for a fundamental optical frequency; calculating a second lattice constant of the second material so that a second group velocity of a second optical frequency is substantially the same as the first group velocity associated with the fundamental optical frequency of the first material; determining a photonic band gap arrangement for achieving quasi phase matching in the photonic band gap structure; and implementing the first lattice constant of the first material and the second lattice constant of the second material in accordance with the photonic band gap arrangement to achieve quasi phase matching in the photonic band gap structure.

20 Claims, 6 Drawing Sheets

TECHNIQUE FOR QUASI-PHASE MATCHING

BACKGROUND OF THE INVENTION

The invention relates generally to optical quasi-phase matching and, more particularly, to a technique for achieving quasi-phase matching by varying lattice constants of a periodic photonic band gap crystal structure.

Nonlinear optical devices incorporating quasi-phase matching have become increasingly important in various optical devices and applications, such as optical parametric amplifiers for signal pre-amplification and more complicated signal processing schemes such as spectral inversion or optical mixing. Multiple wavelengths of light propagate within these devices. Performance is a critical function of the relative phases of waves which is governed by their respective speeds of propagation. In such systems, phase matching may be required or at least preferred. Traditional methods for achieving phase matching include birefringent phase matching, waveguide device tuning, or periodic domain reversal. However, birefringent tuning is difficult to achieve over a range of wavelengths. Moreover, Quasi-Phase Matching (QPM) via periodic domain reversals of a ferroelectric such as Lithium Niobate (LiNbO$_3$) is difficult to process. In particular, lithographic patterning is difficult to realize due in part to complex processing requirements. In addition, the range of materials available is very limited.

Quasi-phase matching is a technique for phase matching non-linear processes to generate optical waves that have wavelengths different from the optical waves generating them. Quasi-phase matching compensates for dispersion in a non-linear material by modulating the non-linearity with a proper period such that different wavelengths involved in the non-linear process stay in phase over an interaction length.

Birefringent phase matching with bulk crystals has been demonstrated but is generally not suitable for single mode waveguide optics. QPM with Periodically Poled Lithium Niobate (PPLN) has been demonstrated and waveguides have been fabricated via Titanium (Ti) diffusion or hydrogen (H) implantation. Semiconductors, such as GaAs, have been grown with appropriate domain reversals to accomplish QPM. However, current technologies have failed to efficiently and effectively incorporate QPM in nonlinear optical devices.

These and other drawbacks exist in current systems and techniques.

BRIEF DESCRIPTION OF THE INVENTION

In accordance with an exemplary aspect of the present invention, a method for achieving quasi phase matching in a photonic band gap structure comprising a first material and a second material is disclosed. In one particular exemplary embodiment, the method comprising the steps of calculating a coherence length of an optical interaction of interest involving at least a first frequency and a second frequency; calculating a first lattice constant of the first material to achieve a predetermined first group velocity for a fundamental optical frequency; calculating a second lattice constant of the second material so that a second group velocity of a second optical frequency is substantially the same as the first group velocity associated with the fundamental optical frequency of the first material; determining a photonic band gap arrangement for achieving quasi phase matching in the photonic band gap structure; and implementing the first lattice constant of the first material and the second lattice constant of the second material in accordance with the photonic band gap arrangement to achieve quasi phase matching in the photonic band gap structure.

Aspects of the present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 2:
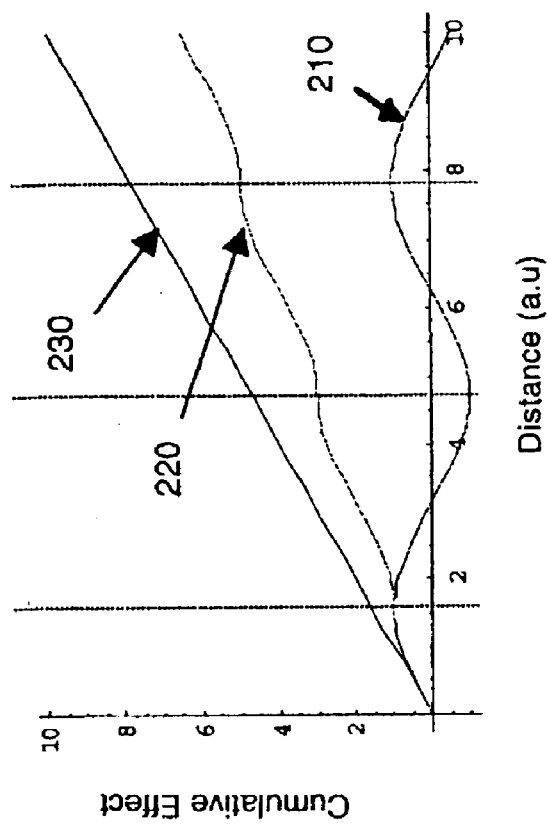
FIG. 2 shows a cumulative effect in accordance with an embodiment of the present invention.

Phase matching generally refers to making velocities of multiple optical wavelengths line up appropriately within a nonlinear material. Quasi-phase matching may involve using periodic reversals of a mismatched configuration to maintain the respective waves in approximate phase. Optical velocities may change near band edges in modal structures such as waveguides and/or Photonic Band Gap (PBG) crystals. An approach according to an embodiment of the present invention for achieving QPM may involves varying a lattice constant of a PBG structure to periodically alter a velocity relationship of multiple propagating waves.

An aspect of the present invention is directed to nonlinear optical devices incorporating quasi-phase matching. A scheme for quasi-phase matching by varying lattice constants of a periodic photonic band gap crystal is provided. The technique of an embodiment of the present invention is more easily integrated with manufacturing techniques and permits the use of a wide range of materials, such as polymer materials doped with dielectric or metallic spheres and photodefinable polymers, for example.

According to an embodiment of the present invention, a material may be selected for some desirable property, such as high optical nonlinearity or process compatibility. A photonic bandgap structure may be created within the material by adding a periodic array formed by a second material with a different dielectric constant. The position of the second material may form a pattern, such as geometric pattern or superlattice structure, for example. The pattern for QPM may be derived based upon device functionality, operating wavelengths, and/or inherent velocities of propagation within the bulk material. By varying the lattice constant of a photonic band gap crystal, the velocity of the wavelength close to the band edge may be perturbed up and down. For example, a material may be designed for a second harmonic generation, where a fundamental optical frequency is converted to a second harmonic frequency. The velocity of propagation within the material is different at the two respective optical frequencies thereby limiting a coherence length of interaction and the efficient power conversion from the fundamental frequency to a first harmonic frequency.

According to an embodiment of the present invention, a PBG structure may be designed to achieve phase matching over a long coherence length. A first PGB lattice may be designed for a fundamental optical frequency in a x-z plane of the structure. A second PBG lattice may be designed for an orthogonal y-z plane such that the velocity at the second harmonic frequency is equal to the velocity of the fundamental optical frequency. Some iteration may be involved to match the respective velocities in each PBG lattice. The net result will have the fundamental frequency propagating in a first polarization state and the second harmonic frequency propagating in a second orthogonal polarization state.

The material may be processed (e.g., lithographically, etc.) to produce a desired QPM pattern. Complicated QPM patterns may be produced with little modification of the process, unlike periodic poling of $LiNbO_3$. In addition, waveguides based on defect introduction may be fabricated during the same step.

Quasi-phase matching may also be achieved in a PBG structure by varying a non-linear dielectric coefficient of a material according to a spatially varying sinusoidal function, where the material may be one or both of the first material and the second material. A period of the sinusoidal function may be tuned to match a coherence length of an optical process in the absence of PBG tuning. The coherence length is a direct function of the optical frequency or frequencies that are intended to interact. A PBG material may be designed such that a lattice period is a sinusoidally varying function that matches a nominal coherence length.

A technique of an embodiment of the present invention may reduce processing time compared to fabrication of PPLN, for example. To make a PPLN waveguide, numerous elaborate steps are performed. For example, the material must be masked, electroded, and poled in a suitable solution. In addition, the mask is stripped, masked again, Ti is deposited, Ti is diffused during a high temperature anneal and integrated with subsequent devices. The approach of an embodiment of the present invention involves a simpler, more efficient technique which includes a masking step and a lithography step to produce a variety of useful structures. The process of an embodiment of the present invention does not require temperature extremes (such as Ti diffusion) that may destroy other devices. The technique of an embodiment of the present invention may be applied to a wide variety of materials, including polymers, semiconductors, etc.

Figure 1:
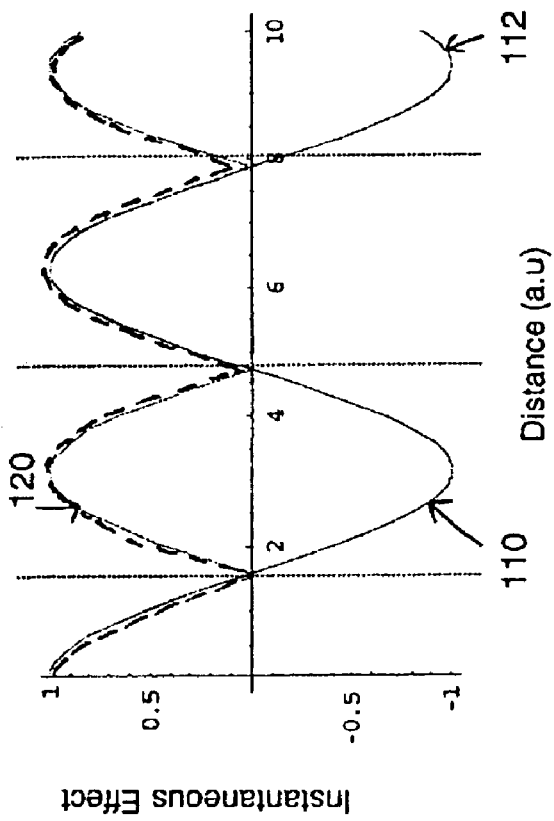
FIG. 1 is an example of a quasi-phase matching approach.

FIG. 1 is an example of a quasi-phase matching approach. In an unmatched material, the nonlinear effect may vary in amplitude with distance thereby creating and depleting a desired wavelength with an averaged effect of zero. By flipping a phase shift relationship every period, for example, as shown in FIG. 1, the effect is always positive. Curves 110 and 112 illustrate an unmatched nonlinear effect. Curve 120 illustrates an approximation to birefringent phase matching by reversing domains.

FIG. 2 shows a cumulative effect in accordance with an embodiment of the present invention. In an ideally phase matched material, the effect may grow linearly with length as shown by 230 while in an unmatched material the effect is on average zero as shown by 210. The quasi-phase matched approach of an embodiment of the present invention may lead to an average growth of a desired effect with length as shown by 220.

Figure 3:
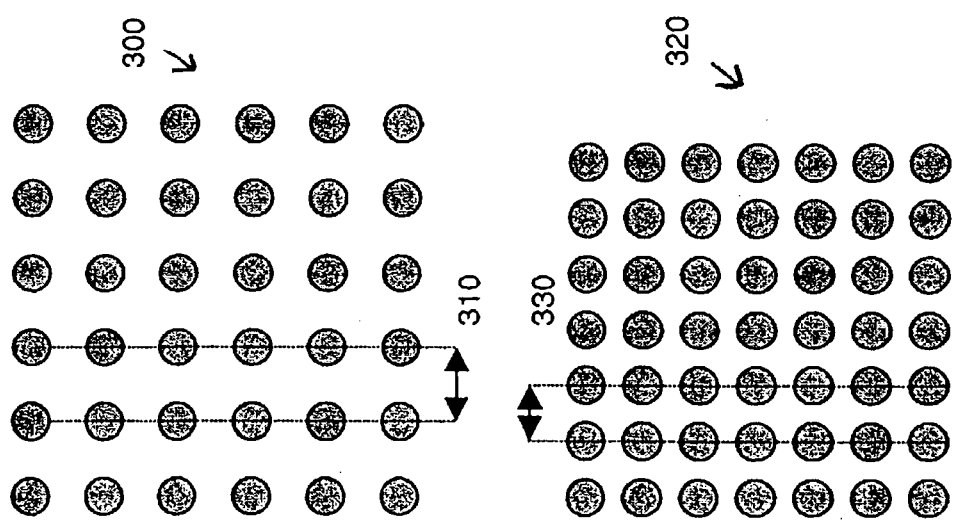
FIG. 3 is an example of photonie band gap crystal material in accordance with an embodiment of the present invention.

FIG. 3 illustrates examples of photonic band gap crystal materials in accordance with an embodiment of the present invention. FIG. 3 illustrates a first material 300 having a first lattice constant as illustrated by 310 and a second material 320 having a second lattice constant as illustrated by 330. Material 300 and material 320 are two different materials having different lattice constants (e.g., spacing) and a normalized representative band structure. Other materials may include a nonlinear dielectric material with embedded holes where the holes may be filled with a second dielectric or other material. In another example, a series of pillars of a nonlinear dielectric with a surrounding matrix that may or may not be filled may be implemented. Other structures may be implemented in accordance with an embodiment of the present invention.

Because of different wavelengths or possibly polarizations, signals are likely to experience significantly different refractive indices, which may vary with wavelength and polarization. This variation with wavelength is referred to as dispersion. The variation with polarization is referred to as birefringence.

An example may involve a one dimensional (1D) photonic bandgap (PBG) structure which comprises a periodic variation in a material index of refraction as indicated by n1 and n2, as shown below:

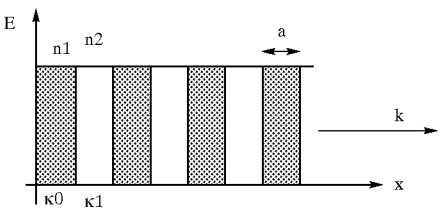

To understand how an electromagnetic wave can propagate in a one dimensional (1D) structure as shown above, a wave equation for E(x,t) may be calculated as follows:

$$c^2 \in^{-1}(x) d^2E/dx^2 = d^2E/dt^2$$

A dielectric function for the 1D PBG may be represented as a Fourier series of the form:

$$\in^{-1}(x) = \Sigma \kappa_m exp(i2\pi mx/a)$$

Using standard Fourier transform methods to solve the electromagnetic wave equation, propagating wave modes may be calculated in terms of a dielectric function ($\kappa 0$, $\kappa 1$) and a lattice constant a. A dispersion relation for the 1D case may be expressed in the form:

$$\omega = \pi c/a \; sqrt[\kappa +/- |\kappa 1|] +/- [(ac/\pi \kappa 1)(\kappa 0^2 - |\kappa 1|^2/2(\kappa - \pi/a)^2]$$

where velocity $c=\lambda v$ and wavenumber $k=2\pi/\lambda$. For a 1D PBG structure, modes are not able to propagate in the following frequency intervals:

$$(\pi c/a)sqrt(\kappa 0-|\kappa 1|) < \omega < (\pi c/a)sqrt(\kappa 0-|\kappa 1|)$$

Figure 4:
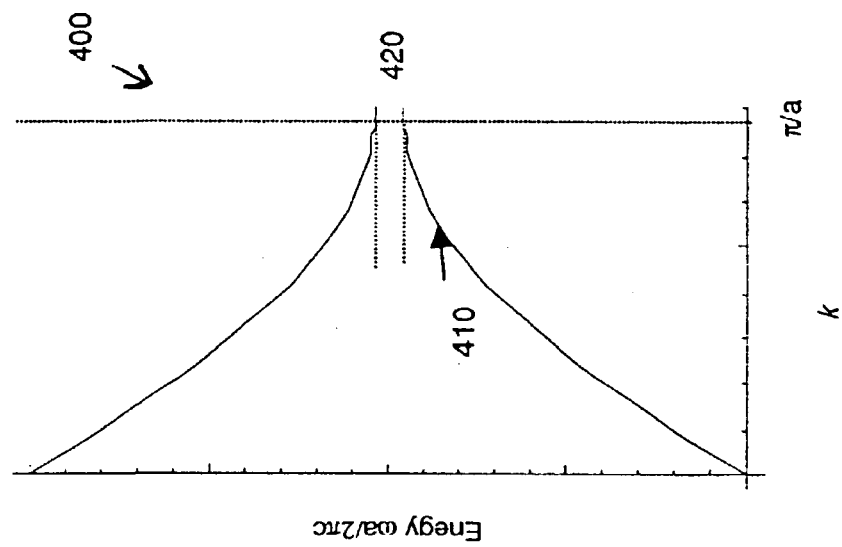
FIG. 4 is an example of a dispersion change in accordance with an embodiment of the present invention.

Thus, a bandgap (as illustrated in FIG. 4 as 420) at a reciprocal lattice position $\pi/a$ is a function of a difference between the two refractive indices (n1, n2) that make up the PBG structure. This bandgap calculation may be extended to two or three dimensions and may be used to engineer specific gaps.

To control the wave velocity at a given frequency and to achieve quasi-phase matching, a group velocity may be calculated. The group velocity may represent a slope of the dispersion relation given above for the 1D case as shown below:

$$v_\delta = \delta\omega/\delta k$$

This relation may be extended to the three dimensional case with the assistance of computer simulation, and therefore may be applied to a superstructure of photonic bandgap materials that include a quasi-phase matched material.

FIG. 4 is an example of a dispersion change in accordance with an embodiment of the present invention. Dispersion changes the relative velocities of different frequencies of light within a material. By changing the lattice constant (or lattice period), the magnitude and sign of the differences may be changed. Near a band gap edge 410, the slope of the bands may change thereby resulting in a change of velocity with wavelength. By varying the lattice constant, the velocity of an optical wavelength near band edge 420 may be changed.

Figure 5:
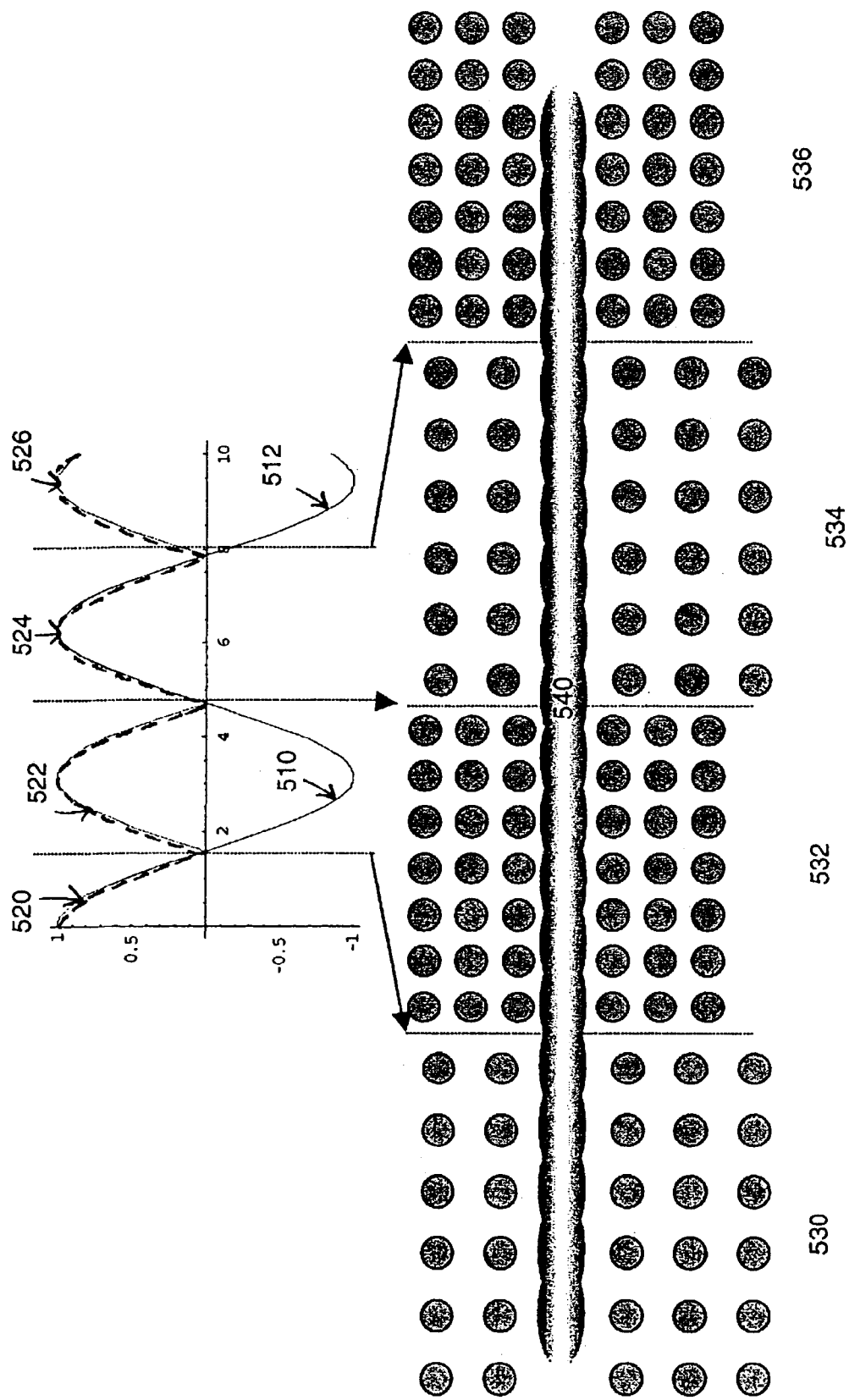
FIG. 5 is an example of a quasi-phase matching accomplished by lattice constant variation rather than periodic poling in accordance with an embodiment of the present invention.

FIG. 5 is an example of quasi-phase matching accomplished by lattice constant variation in accordance with an embodiment of the present invention.

As shown in FIG. 5, quasi-phase matching may be achieved through variations in PBG dispersion. A first material 530 with a first lattice constant may be represented by curve 520. A second material 532 with a second lattice constant may be represented by curve 510. By varying the lattice constant, a reverse domain may be introduced as shown by curve 522. A third material 534 with a third lattice constant may be represented by curve 524. A fourth material 536 with a fourth lattice constant may be represented by curve 512. The first material 530 and the third material 534 may be the same (or a substantially similar) material where the first lattice constant and the third lattice constant are the same (or substantially similar). The second material 532 and the fourth material 536 may be the same (or a substantially similar) material where the second lattice constant and the second lattice constant are the same (or substantially similar). By varying the lattice constant, a reverse domain may be introduced as shown by curve 526. As shown in FIG. 5, an integrated waveguide 540 may be formed by introducing lattice defects. For example, waveguide 540 may be formed by omitting a row of pillars or holes.

According to an embodiment of the present invention, a PBG structure may be designed to achieve phase matching over a long coherence length. A first PGB lattice may be designed for a fundamental optical frequency in a x-z plane of the structure. A second PBG lattice may be designed for an orthogonal y-z plane such that the velocity at the second harmonic frequency is equal to the velocity of the fundamental optical frequency. Some iteration may be involved to match the respective velocities in each PBG lattice. The net result will have the fundamental frequency propagating a first polarization state, e.g., polarized in the sagittal plane (e.g., x-z plane of the PBG structure), and the second harmonic frequency propagating in a second orthogonal polarization state, e.g., polarized in a horizontal or x-y plane of the PBG structure.

Figure 6:
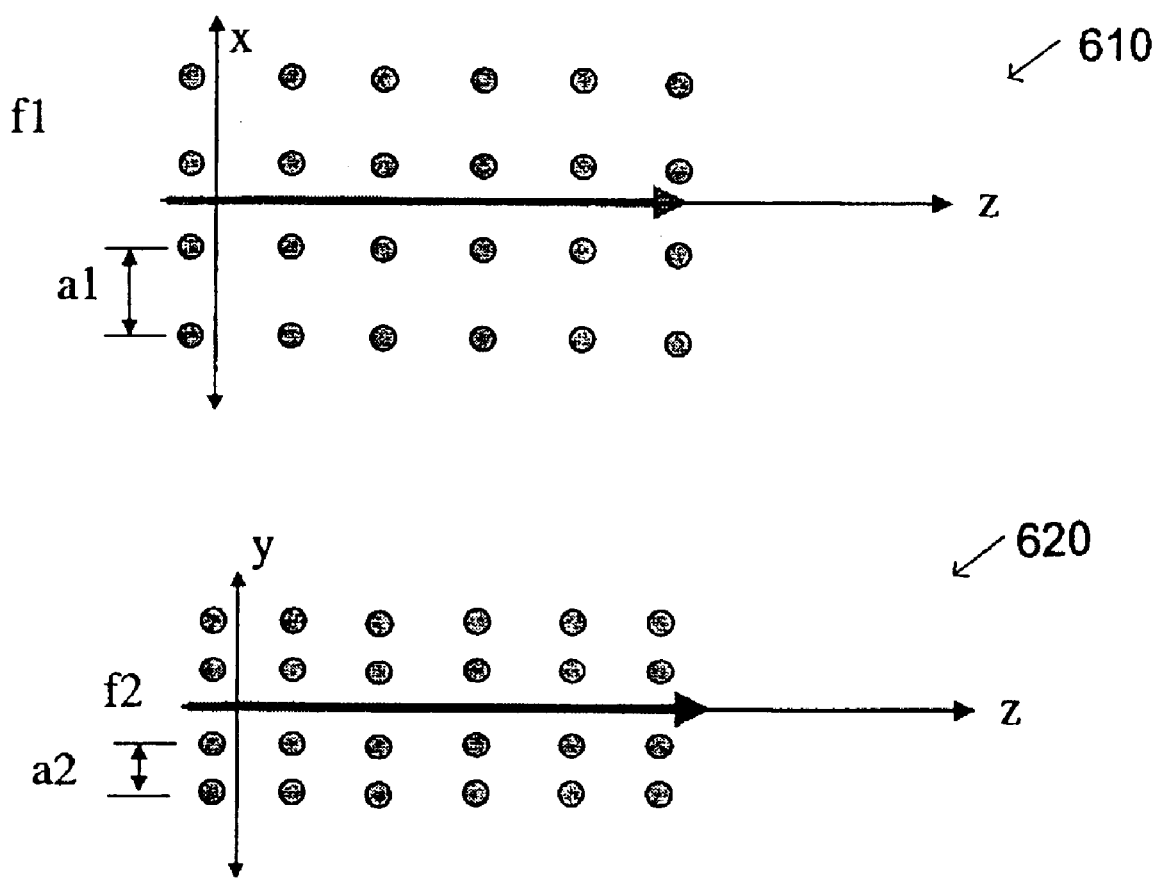
FIG. 6 is another example of quasi-phase matching in accordance with an embodiment of the present invention.

FIG. 6 is another example of quasi-phase matching in accordance with an embodiment of the present invention. A first material may include a PBG structure having a lattice constant a1 oriented in a x-z plane of the quasi-phase matched device, as shown by 610. A second material may include a PBG structure having a lattice constant a2 oriented in a y-z plane of a quasi-phase matched device, as shown by 620. The first material may be designed to provide a specific index of refraction of a first optical frequency f1. The second material may be designed so that the index of refraction for a second optical frequency f2 is matched to that of the first optical frequency f1 in the first material 530. As a result, the coherence length is extended and an efficient interaction between optical frequency f1 and optical frequency f2 is enhanced.

Quasi-phase matching may also be achieved in a PBG structure by varying a non-linear dielectric coefficient of a material according to a spatially varying sinusoidal function, where the material may be one or both of the first material and the second material. A period of the sinusoidal function may be tuned to match a coherence length of an optical process in the absence of PBG tuning. The coherence length is a direct function of the optical frequency or frequencies that are intended to interact. For example, to mix frequency f1 with frequency f2 to produce frequency f3 involves precise phase matching of the respective wavenumber (k)–vectors, such that $\Delta k = k3-(k1+k2)$. The corresponding coherence length is equal to two times $\pi$ divided by $\Delta k$. The nonlinear coefficient will follow directly by varying the index of refraction, or optical velocity, in the material according to the sinusoidal function. A PBG material may be designed such that a lattice period is a sinusoidally varying function that matches a nominal coherence length.

Figure 7:
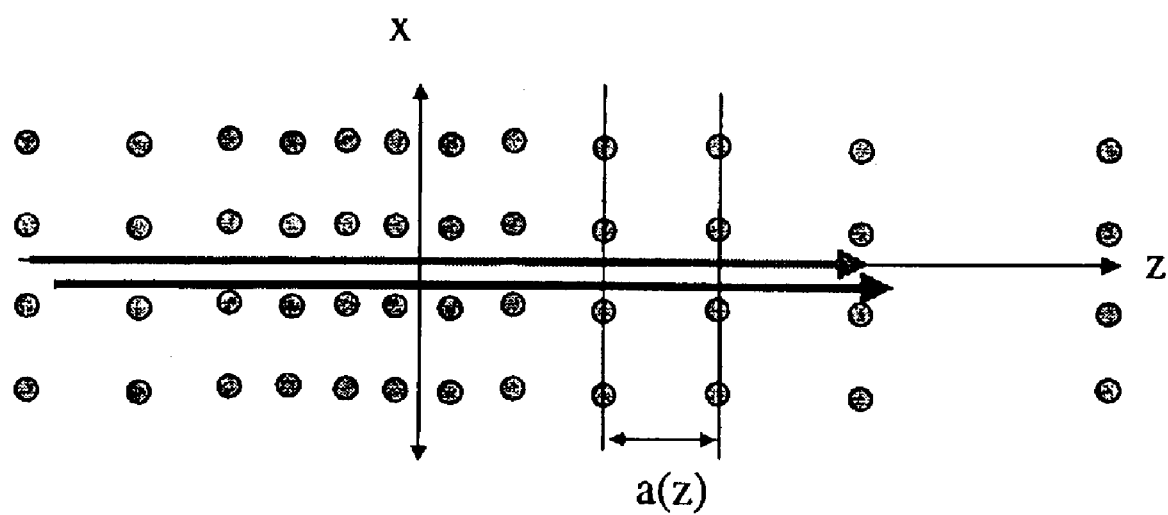
FIG. 7 is an example of a PBG structure with a sinusoidally varying period in accordance with an embodiment of the present invention.

FIG. 7 is an example of a PBG structure with a sinusoidally varying period in accordance with an embodiment of the present invention. As shown in FIG. 7, a sinusoidally varying lattice constant a(z) arrangement may be used to provide a sinusoidally varying index of refraction. The index of refraction may contain a non-linear coefficient that may also vary sinusoidally. As the period of the sinusoid is adjusted to match a coherence length of a given optical interaction, quasi-phase matching is achieved for that interaction.

Figure 8:
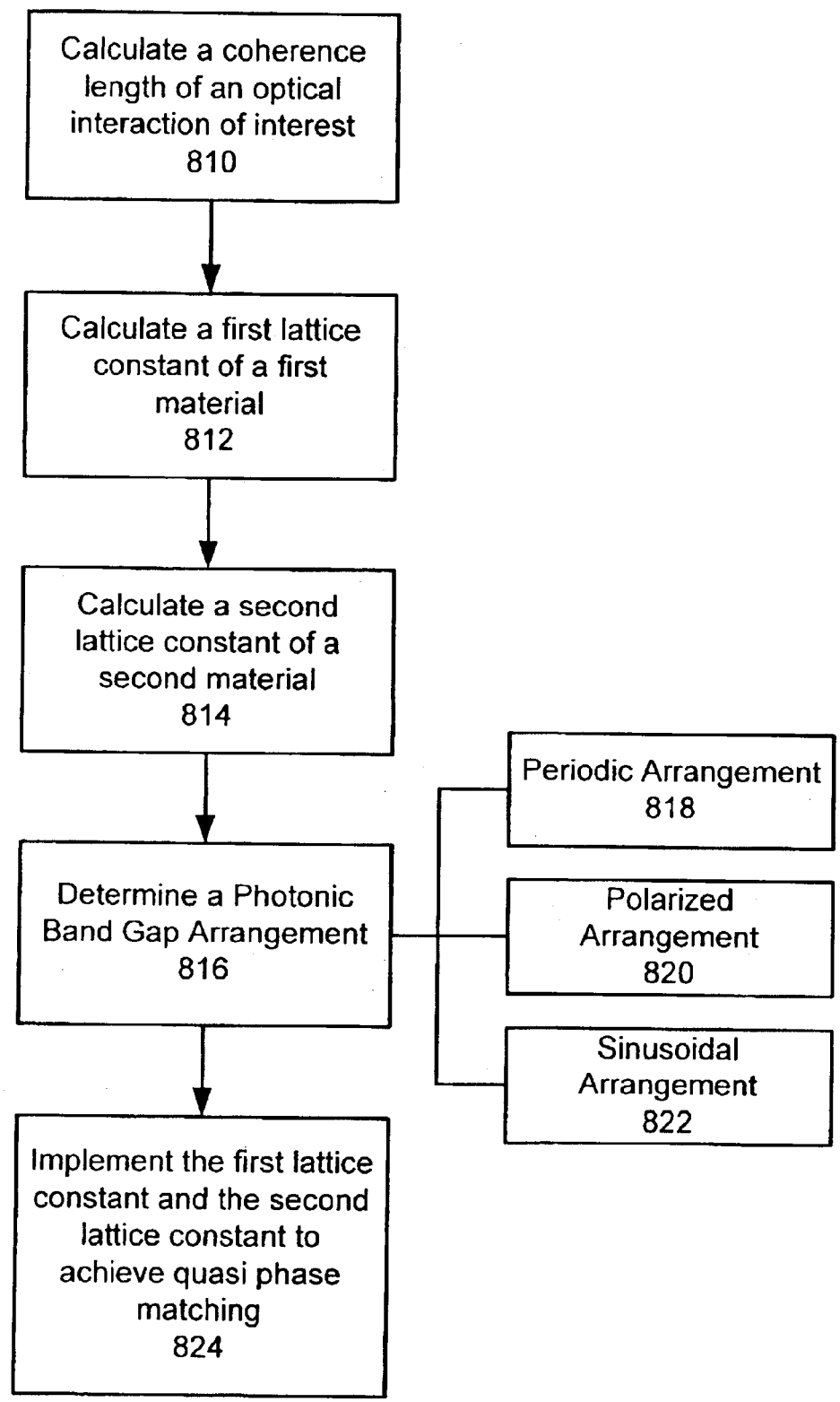
FIG. 8 is a flowchart illustrating a method for achieving optical quasi-phase matching in accordance with an embodiment of the present invention.

FIG. 8 is a flowchart illustrating a method for achieving optical quasi-phase matching in a PGB structure in accordance with an embodiment of the present invention. At step 810, a coherence length of a desired optical interaction may be calculated. At step 812, a first lattice constant of a first material may be calculated to achieve a desired group velocity for a fundamental optical frequency. At step 814, a second lattice constant of a second material may be calculated such that a desired second optical frequency having substantially the same group velocity as the fundamental optical frequency associated with the first material. The desired optical frequency may be an optical frequency that an optical beam is to be converted to. The desired optical frequency may be a multiple of the fundamental optical frequency. At step 816, a desired arrangement for the PBG structure may be determined. The arrangement may include a periodic variation of the two materials along a propagation direction, a polarization dependent arrangement and a sinusoidal variation of lattice constant. For the periodic variation of step 818, the first material having a first lattice constant may be interlaced with the second material having a second lattice constant with a period substantially equal to the coherence length calculated in step 810. The period refers to the length of each material as it varies periodically in the propagation direction. For the polarized dependent arrangement of step 820, the first material may be oriented in one optical polarization and the second material may be oriented in an orthogonal polarization plan. For the sinusoidal variation of step 822, a material may be designed with a sinusoidally varying lattice constant with a periodicity substantially equal to the coherence length calculated in step 810. At step 824, the first lattice constant and the second lattice constant may be implemented in accordance with the desired arrangement to achieve quasi-phase matching in a photonic band gap structure.

An embodiment of the present invention is directed to obtaining nonlinear phase matching by changing a band structure of a photonic band gap or similar material containing nonlinear optical material. Quasi-phase matching may be achieved by varying a lattice constant across a device. In addition, a waveguide may be integrated in such a device. The lattice constants of the photonic band gap material may be varied in 1, 2 or 3 dimensions. Nonlinear optical properties of the PBG may also be used to change the phase matching via application of either light or an electric field, or other means including electrical or chemical.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for achieving quasi phase matching in a photonic band gap structure comprising at least a first material and a second material, the method comprising the steps of:

calculating a coherence length of an optical interaction of interest involving at least a first frequency and a second frequency;

calculating a first lattice constant of the first material to achieve a predetermined first group velocity for a fundamental optical frequency;

calculating a second lattice constant of the second material so that a second group velocity of a second optical frequency is substantially the same as the first group velocity associated with the fundamental optical frequency of the first material;

determining a photonic band gap arrangement for achieving quasi phase matching in the photonic band gap structure; and implementing the first lattice constant of the first material and the second lattice constant of the second material in accordance with the photonic band gap arrangement to achieve quasi phase matching in the photonic band gap structure.

2. The method of claim 1, wherein the photonic band gap arrangement comprises a periodic arrangement.

3. The method of claim 2, further comprising the step of:

periodically varying the first material and the second material along a propagation direction according to a periodic structure that corresponds to the coherence length.

4. The method of claim 1, wherein the photonic band gap arrangement comprises a polarized arrangement.

5. The method of claim 4, further comprising the steps of:

orienting the first lattice constant of the first material in a first plane for a first optical polarization; and orienting the second lattice constant of the second material in a second plane for a second optical polarization wherein the second plane is orthogonal to the first plane.

6. The method of claim 1, further comprising the steps of:

designing the first material to provide a first index of refraction for the fundamental optical frequency; and designing the second material to provide a second index of refraction for a second optical frequency to match the first index of refraction;

wherein the coherence length is extended.

7. The method of claim 4, wherein the fundamental optical frequency propagates in a first plane and the second optical frequency propagates in a second plane orthogonal to the first plane.

8. The method of claim 1, wherein the photonic band gap arrangement comprises a sinusoidal arrangement.

9. The method of claim 8, wherein at least one of the first lattice constant and the second lattice constant varies according to a sinusoidal function.

10. The method of claim 9, wherein sinusoidal function has a period that corresponds to the coherence length for the optical interaction of interest.

11. The method of claim 1, wherein the first material and the second material are non-linear optical materials.

12. The method of claim 2, wherein the photonic band gap structure comprises one or more additional materials to form a periodic structure.

13. The method of claim 1, wherein the photonic band gap structure is a two-dimensional structure.

14. The method of claim 1, wherein the photonic band gap structure is a three-dimensional structure.

15. The method of claim 1, wherein at least one of the first material and second material comprises a nonlinear first dielectric material with a plurality of embedded holes.

16. The method of claim 15, wherein the embedded holes comprise a second dielectric material.

17. The method of claim 1, further comprising the step of:

forming an integrated waveguide in the photonic band gap structure by introducing a lattice defect.

18. The method of claim 1, wherein at least one of the first group velocity and the second group velocity is calculated as:

$$v_g = \delta\omega/\delta k$$

wherein $\omega$ represents a dispersion relation and k represents a wavenumber.

19. The method of claim 1, wherein the step of implementing further comprising the steps of processing the first material using a lithography process.

20. The method of claim 1, wherein the step of implementing further comprises the step of processing the second material using a lithography process.

* * * * *